US012698895B1

(12) United States Patent
Zheng

(10) Patent No.: US 12,698,895 B1
(45) Date of Patent: Aug. 4, 2026

(54) FAN LAMP

(71) Applicant: HANGZHOU JUXING INTELLIGENT TECHNOLOGY CO., LTD., Hangzhou (CN)

(72) Inventor: Hongbing Zheng, Hangzhou (CN)

(73) Assignee: HANGZHOU JUXING INTELLIGENT TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/343,794

(22) Filed: Sep. 29, 2025

(30) Foreign Application Priority Data

Aug. 28, 2025 (CN) ......................... 202521848540.5

(51) Int. Cl.
*F21V 33/00* (2006.01)
*F21V 3/02* (2006.01)
*F21Y 107/30* (2016.01)

(52) U.S. Cl.
CPC ............ *F21V 33/0096* (2013.01); *F21V 3/02* (2013.01); *F21Y 2107/30* (2016.08)

(58) Field of Classification Search
CPC ................... F21V 3/00–12; F21V 5/08; F21V 33/0088–0096; F21Y 2107/30
See application file for complete search history.

(56) References Cited

FOREIGN PATENT DOCUMENTS

CN 104930374 A * 9/2015 .............. F21V 13/04

* cited by examiner

*Primary Examiner* — Jason M Han

(57) ABSTRACT

A fan lamp is provided. The fan lamp includes a fan assembly and a light-emitting assembly disposed on a periphery of the fan assembly. The light-emitting assembly includes a light-transmitting cover and a light-shielding member. The light-shielding member is mounted in a middle portion of an outer side wall of the light-transmitting cover, so that a lower bright region, a middle dark region, and an upper bright region are formed in sequence on the light-emitting assembly in a light-emitting state.

16 Claims, 5 Drawing Sheets

FAN LAMP

CROSS-REFERENCE TO RELATED APPLICATION

This application claims priority to Chinese patent application No. 202521848540.5, filed on Aug. 28, 2025, and titled "FAN LAMP". The content of the above identified application is hereby incorporated herein in its entirety by reference.

TECHNICAL FIELD

The present disclosure relates to the field of electrical appliances technology, and in particular, to a fan lamp.

BACKGROUND

A fan lamp is disposed on an outer peripheral side of a fan. In order to increase a light-emitting area of the fan lamp and achieve a lighting effect that both ends of the fan lamp can emit light in a height direction of the fan lamp, the existing fan lamp is equipped with two groups of light-transmitting covers arranged at intervals in the height direction of the fan lamp, and the two groups of light-transmitting covers can form two light-emitting surfaces arranged at intervals in the height direction of the fan lamp. The number of components of such fan light is high and assembly is complicated.

SUMMARY

In view of above, it is necessary to provide a fan lamp with fewer components and a simplified assembly process.

The fan lamp of the present disclosure includes a fan assembly and a light-emitting assembly disposed on a periphery of the fan assembly. The light-emitting assembly includes a light-transmitting cover and a light-shielding member. The light-shielding member is mounted in a middle portion of an outer side wall of the light-transmitting cover, so that a lower bright region, a middle dark region, and an upper bright region are formed in sequence on the light-emitting assembly in a light-emitting state.

The fan lamp of the present disclosure prevents light from emitting from the middle portion of the outer side wall of the light-transmitting cover through the light-shielding member to obtain the middle dark region. Light can normally emit from the upper portion of the outer side wall of the light-transmitting cover that is not shielded by the light-shielding member to form the upper bright region; light can normally emit from the lower portion of the outer side wall of the light-transmitting cover that is not shielded by the light-shielding member to form the lower bright region, thereby forming two light-emitting surfaces arranged at intervals on the outer side wall of the light-transmitting cover, so as to obtain a light-emitting effect equivalent to that of the existing similar fan lamp. There is no need to arrange two groups of light-transmitting covers at intervals, and the number of the light-transmitting covers is reduced, so that assembly steps and the number of parts of the fan lamp of the present disclosure are reduced, and the assembly process is simplified.

In some embodiments, the light-shielding member is connected to the light-transmitting cover in an insertion manner.

In some embodiments, the middle portion of the outer side wall of the light-transmitting cover is provided with a first mounting groove, and at least a part of the light-shielding member is embedded in the first mounting groove.

In some embodiments, an upper portion and a lower portion of the outer side wall of the light-transmitting cover are aligned with and in contact with edges of the light-shielding member, respectively.

In some embodiments, the light-emitting assembly further includes a light source and a back plate, an inner side wall of the light-transmitting cover is provided with a second mounting groove, and the light source is disposed in the second mounting groove and fixed to the light-transmitting cover through the back plate.

In some embodiments, the light-shielding member includes a shielding plate and a reflective paper, and the reflective paper is disposed between the shielding plate and the middle portion of the outer side wall of the light-transmitting cover.

In some embodiments, the light-emitting assembly includes a plurality of light-transmitting covers and a plurality of light-shielding members, the plurality of light-transmitting covers are spliced end to end, and the plurality of light-shielding members are connected end to end.

In some embodiments, the plurality of light-transmitting covers are in one-to-one correspondence with the plurality of light-shielding members, respectively, the plurality of light-transmitting covers are arranged with equal lengths, and the plurality of light-shielding members are arranged with equal lengths.

In some embodiments, the upper bright region is uniformly arranged along a circumferential direction of the fan assembly and a width of the upper bright region is constant along the circumferential direction of the fan assembly, the lower bright region is uniformly arranged along the circumferential direction of the fan assembly and a width of the lower bright region is constant along the circumferential direction of the fan assembly, and the middle dark region is uniformly arranged along the circumferential direction of the fan assembly and a width of the middle dark region is constant along the circumferential direction of the fan assembly.

In some embodiments, the light-emitting assembly is in a complete ring shape or a partial ring shape.

In some embodiments, the light-shielding member includes a shielding plate, and a side of the shielding plate adjacent to the outer side wall of the light-transmitting cover is coated with a reflective coating.

In some embodiments, the reflective paper is provided with a positioning hole, one of the light-transmitting cover and the shielding plate is provided with an insertion block, and the insertion block passes through the positioning hole and extends into the other of the light-transmitting cover and the shielding plate.

Details of one or more embodiments of the present disclosure are presented in the attached drawings and descriptions below. And other features, purposes and advantages of this application will become apparent from the description, drawings and claims.

BRIEF DESCRIPTION OF THE DRAWINGS

For a better description and illustration of embodiments and/or examples of those disclosures disclosed herein, reference may be made to one or more attached drawings. Additional details or examples used to describe the drawings should not be considered as limiting the scope of any of the disclosed disclosures, currently described embodiments and/or examples, and currently understood best modes of these disclosures.

Figure 1:
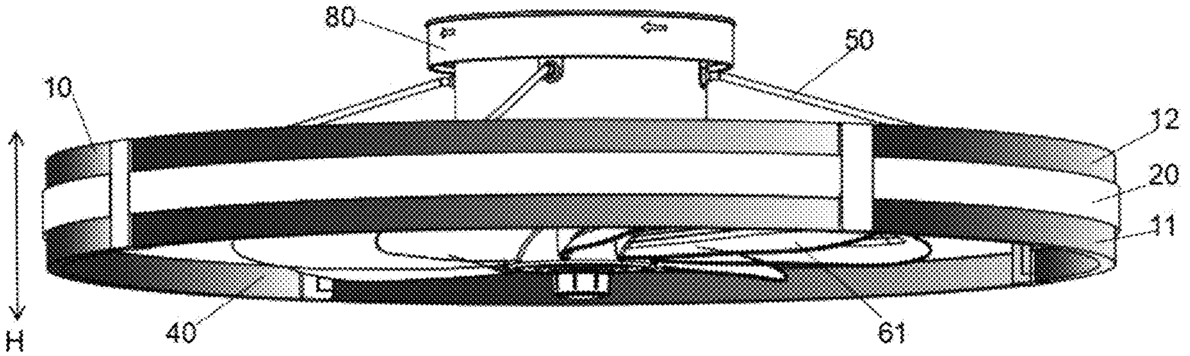
FIG. 1 is a perspective view of a fan assembly according to an embodiment of the present disclosure.
Figure 2:
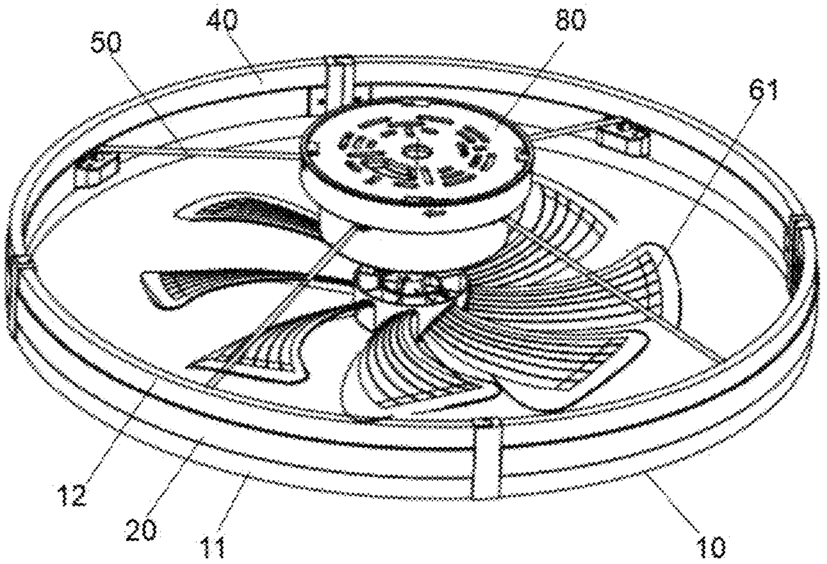
FIG. 2 is a schematic diagram of the fan assembly of FIG. 1 in a first view.

In the figures, 10 represents a light-transmitting cover; 11 represents a lower bright region; 12 represents an upper bright region; 14 represents a first mounting groove; 141 represents a slot; 142 represents an embedding groove; 15 represents an end splicing groove; 16 represents an end splicing block; 17 represents a second mounting groove; 20 represents a light-shielding member; 21 represents a shielding plate; 211 represents an inserting block; 22 represents a reflective paper; 221 represents a positioning hole; 30 represents a light source; 31 represents a lamp bead; 32 represents a light strip; 40 represents a back plate; 41 represents a first hook claw; 42 represents a second hook claw; 50 represents a hanging wire; 61 represents a blowing fan; 62 represents a fan end cover; 70 represents a motor; and 80 represents a mounting bottom plate.

DETAILED DESCRIPTION

The technical scheme in the embodiment of the present disclosure will be described clearly and completely with the attached drawings. Obviously, the described embodiment is only a part of the embodiment of the present disclosure, not the whole embodiment. Based on the embodiments in the present disclosure, all other embodiments obtained by ordinary technicians in this field without creative work belong to the protection scope of the present disclosure.

It should be noted that when a component is considered to be "mounted" on another component, it can be directly on the other component or there can be a component in the middle. When a component is considered to be "set on" another component, it can be directly set on another component or there may be intervening components at the same time. When a component is considered to be "fixed" to another component, it can be directly fixed to another component or there may be intervening components at the same time.

Unless otherwise defined, all technical and scientific terms used herein have the same meaning as commonly understood by those skilled in the technical field of this application. The terminology used herein in the specification of this application is only for the purpose of describing specific embodiments and is not intended to limit this application. As used herein, the term "and/or" includes any and all combinations of one or more related listed items.

The present invention provides a fan lamp, as shown in FIG. 1 to FIG. 4, the fan lamp includes a mounting bottom plate 80, a motor 70, a power supply (not shown), a fan assembly and a light-emitting assembly arranged on a periphery of the fan assembly. The fan assembly is rotatably mounted on the mounting bottom plate 80. The motor 70 is arranged on the mounting bottom plate 80 and can drive the fan assembly to rotate around an axis of the fan assembly. The power supply is configured for supplying power to the motor 70 and the light-emitting assembly. The fan assembly includes a blowing fan 61 and a fan end cover 62. The axis of the fan assembly is also an axis of the blowing fan 61, as shown as a dotted line S in FIG. 4. The blowing fan 61 and the fan end cover 62 can be coaxially arranged.

Optionally, an output end of the motor 70 is provided with a driving shaft. An axis of the driving shaft coincides with the axis of the fan assembly. The driving shaft penetrates through and extends out of the blowing fan 61. The fan end cover 62 is mounted at an end of the driving shaft extending out of the blowing fan 61, thereby limiting movement of the blowing fan 61 in an axial direction of the driving shaft.

The light-emitting assembly is located on an outermost side of the blowing fan 61 relative to the axis of the blowing fan 61. In some embodiments, the light-emitting assembly surrounds the blowing fan 61 along a circumferential direction of the axis of the blowing fan 61. The light-emitting assembly may be in a complete circular ring shape or a partial circular ring shape, and the partial circular ring shape is an arc shape.

In other embodiments, the shape of the light-emitting assembly is not limited to a complete circular ring or a partial circular ring, and may also be a polygon, a complete ellipse, an elliptical arc, or the like.

The light-emitting assembly includes a light-transmitting cover 10, a light-shielding member 20, and a light source 30. The light-transmitting cover 10 has a light guiding and homogenizing function. A light transmittance of the light-shielding member 20 is lower than that of the light-transmitting cover 10. The light source 30 is mounted on an inner side wall of the light-transmitting cover 10. The light-shielding member 20 is mounted in a middle portion of an outer side wall of the light-transmitting cover 10, so that a lower bright region 11, a middle dark region, and an upper bright region 12 are formed and sequentially disposed on the light-emitting assembly in a light-emitting state. The light-shielding member 20 can prevent the middle portion of the outer side wall of the light-transmitting cover 10 from emitting light to form a middle dark region. An upper bright region 12 is formed on an upper region of the outer side wall of the light-transmitting cover 10 that is not shielded by the light-shielding member 20 in the light-emitting state, and a lower bright region 11 is formed on a lower portion of the outer side wall of the light-transmitting cover 10 that is not shielded by the light-shielding member 20 in the light-emitting state.

In detail, an inner side wall of the light-transmitting cover 10 is a side of the light-transmitting cover 10 relatively close to the axis of the fan assembly, and an outer side wall of the light-transmitting cover 10 is the side of the light-transmitting cover 10 relatively away from the axis of the fan assembly. The lower bright region 11, the middle dark region, and the upper bright region 12 are disposed along an extending direction of the axis of the fan assembly and gradually approach the mounting bottom plate 80. A direction indicated by arrow H in FIG. 1 is an extension direction of the axis of the fan assembly.

Optionally, the upper bright region 12 is uniformly arranged along a circumferential direction of the fan assembly and a width of the upper bright region 12 is constant along the axis of the fan assembly, the lower bright region 11 is uniformly arranged along the circumferential direction of the fan assembly and a width of the lower bright region 11 is constant along the axis of the fan assembly, and the middle dark region is uniformly arranged along the circumferential direction of the fan assembly and a width of the middle dark region is constant along the axis of the fan assembly. The circumferential direction of the fan assembly is a circumferential direction of the axis of the fan assembly. The widths of the upper bright region 12, the lower bright region 11 and the middle dark region refer to sizes of corresponding regions in the axis of the fan assembly. In this way, when the light-emitting assembly is in the light-emitting state, the upper bright region 12 and the lower bright region 11 both form a light band with a uniform width, and the light-emitting assembly has uniform brightness and illuminance in the circumferential direction of the fan assembly, so that the visual effect is better.

Figure 5:
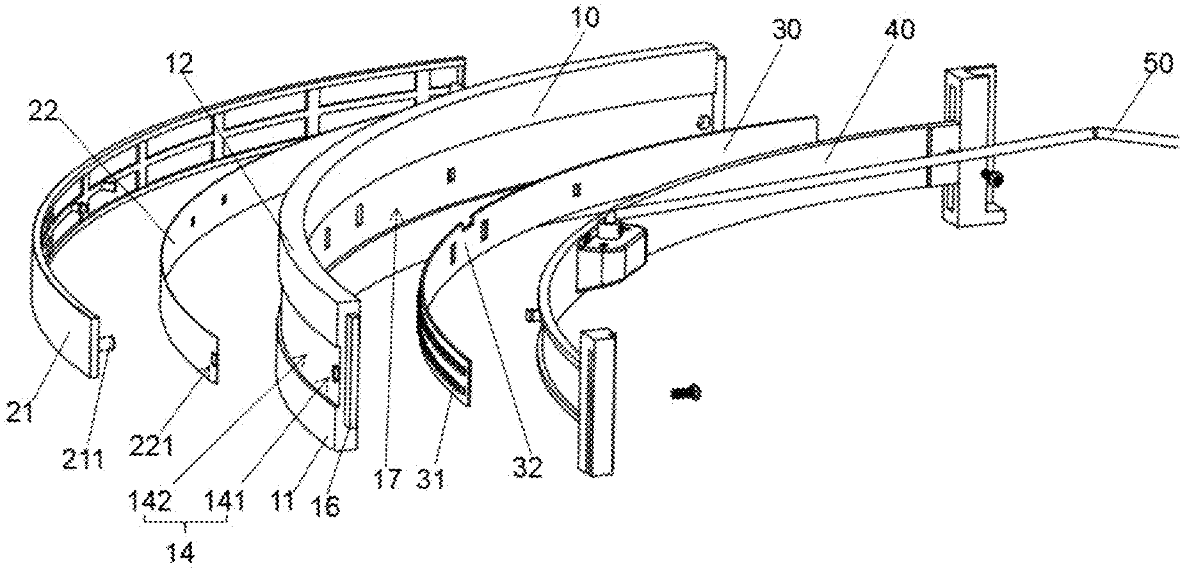
FIG. 5 is an exploded view of a part of a fan lamp in an embodiment of the present disclosure.

Referring to FIG. 5, in some embodiments, the light source 30 includes a light strip 32 and lamp beads 31. The light strip 32 is attached to an inner side wall of the light-transmitting cover 10. The lamp beads 31 are disposed on a side of the light strip 32 adjacent to the light-transmitting cover 10. The light strip 32 is electrically connected to a power supply disposed in the mounting bottom plate 80. The lamp bead 31 may be an LED lamp or a conventional bulb. When the light strip 32 is powered on, the lamp beads 31 are lit, light of the lamp beads 31 is transmitted from the inner side wall of the light-transmitting cover 10 into the interior of the light-transmitting cover 10, and then is emitted from the upper and lower portions of the outer side wall of the light-transmitting cover 10 that are not shielded by the light-shielding member 20, and at this time, the light-emitting assembly is in a light-emitting state.

In some embodiments, the light-shielding member 20 and the light-transmitting cover 10 are spliced and connected.

Figure 6:
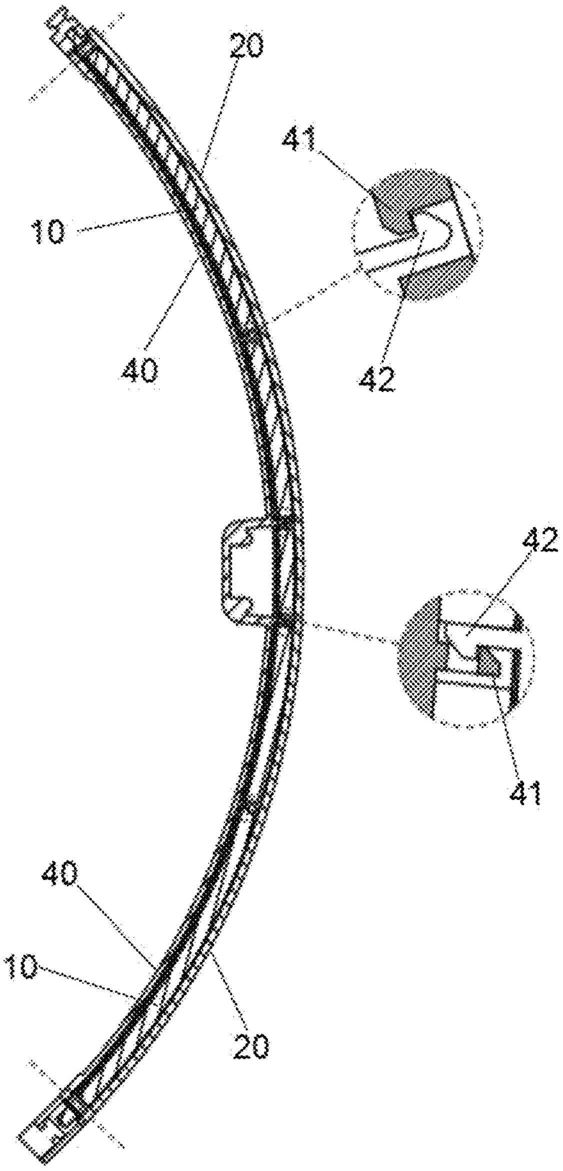
FIG. 6 is a schematic structural diagram of a part of a fan lamp in an embodiment of the present disclosure.
Figure 7:
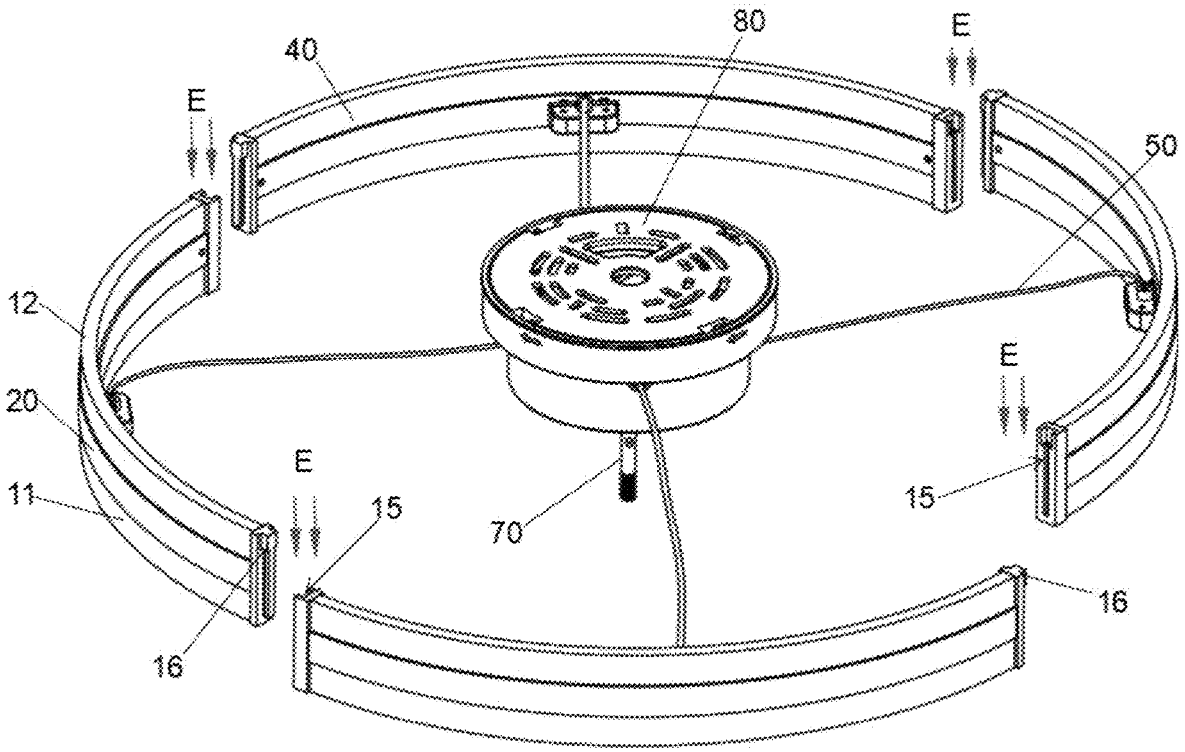
FIG. 7 is a structural schematic diagram of a part of a fan assembly in an embodiment of the present disclosure.

Referring to FIG. 6 to FIG. 7, the light-emitting assembly includes a plurality of light-transmitting covers 10 and a plurality of light-shielding members 20. The number of light-transmitting covers 10 and the number of light-shielding members 20 are equivalent and are arranged in one-to-one correspondence. The plurality of light-transmitting covers 10 are arranged along the circumferential direction of the fan assembly to form a group of light-transmitting covers 10. Any adjacent two of the plurality of light-transmitting covers 10 are connected end to end. The plurality of light-shielding members 20 are arranged along the circumferential direction of the fan assembly to form a group of light-shielding members 20. Any adjacent two of the plurality of light-shielding members 20 are connected end to end. Referring to FIG. 5, the light-transmitting cover 10 and the light-shielding member 20 are both arc-shaped plates. A first mounting groove 14 is formed in the middle portion of the outer side wall of each of the light-transmitting covers 10, and at least a part of each of the light-shielding members 20 is embedded in the first mounting groove 14 of the light-transmitting cover 10 corresponding to the light-shielding member 20.

Referring to FIG. 5 and FIG. 7, a head end of each of the light-transmitting covers 10 is provided with an end splicing groove 15, a tail end of each of the light-transmitting covers 10 is provided with an end splicing block 16. A shape of the end splicing block 16 matches with a shape of an inner wall of the end splicing groove 15. Any adjacent two of the light-transmitting covers 10 matches with the end splicing groove 15 through the end splicing block 16 to realize splicing connection between the head end and the tail end. The end splicing block 16 of one light-transmitting cover 10 can be inserted into the corresponding end splicing groove 15 of the other adjacent light-transmitting cover 10 in a direction of arrow E shown in FIG. 7, and the direction of arrow E can be parallel to the axis of the fan assembly.

With this arrangement, the plurality of light-transmitting covers 10 are easy to connect and have high connection strength.

In some other embodiments, the number of the light-transmitting cover 10 may be one, the light-transmitting cover 10 is bent into an arc shape, and the end splicing block 16 of the light-transmitting cover 10 is adapted to the end splicing groove 15 of the light-transmitting cover 10, so as to realize the splicing connection between the head end and the tail end.

It can be understood that the number of the light-shielding member 20 may also be one.

Referring to FIG. 5, the first mounting groove 14 includes an embedding groove 142 extending along a circumferential direction of the fan assembly, an opening shape of the embedding groove 142 matches with a shape of an edge of the light-shielding member 20, the embedding groove 142 is used for fixedly embedding the light-shielding member 20. When the light-shielding member 20 is embedded in the embedding groove 142, the edge of the light-shielding member 20 is fixedly matched with an inner side wall of the embedding groove 142, and an upper portion of the outer side wall of the light-transmitting cover 10 and a lower portion of the outer side wall of the light-transmitting cover 10 are aligned with the edge of the light-shielding member 20. Specifically, the upper portion of the outer side wall of the light-transmitting cover 10 is neither higher than the light-shielding member 20 nor lower than the light-shielding member 20 in the radial direction of the fan assembly, and the lower portion of the outer side wall of the light-transmitting cover 10 is neither higher than the light-shielding member 20 nor lower than the light-shielding member 20 in the radial direction of the fan assembly.

Preferably, the side of the light-shielding member 20 facing away from the light-transmitting cover 10, the upper portion of the outer side wall of the light-transmitting cover 10, and the lower portion of the outer side wall of the light-transmitting cover 10 are all located in the same cylindrical surface.

In this way, the light-shielding member 20 and the light-transmitting cover 10 are reliably connected and not easily separated, the outer side wall of the light-emitting assembly away from the fan assembly is smooth, and the light emitted from the upper portion of the outer side wall of the light-transmitting cover 10 and the lower portion of the outer side wall of the light-transmitting cover 10 is not blocked by the light-shielding member 20.

Figure 3:
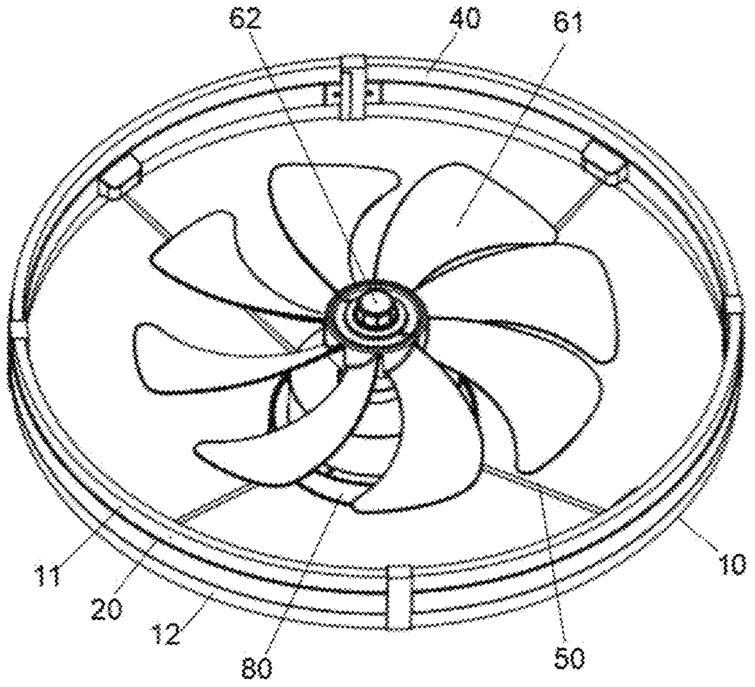
FIG. 3 is a schematic diagram of the fan assembly of FIG. 1 in a second view.
Figure 4:
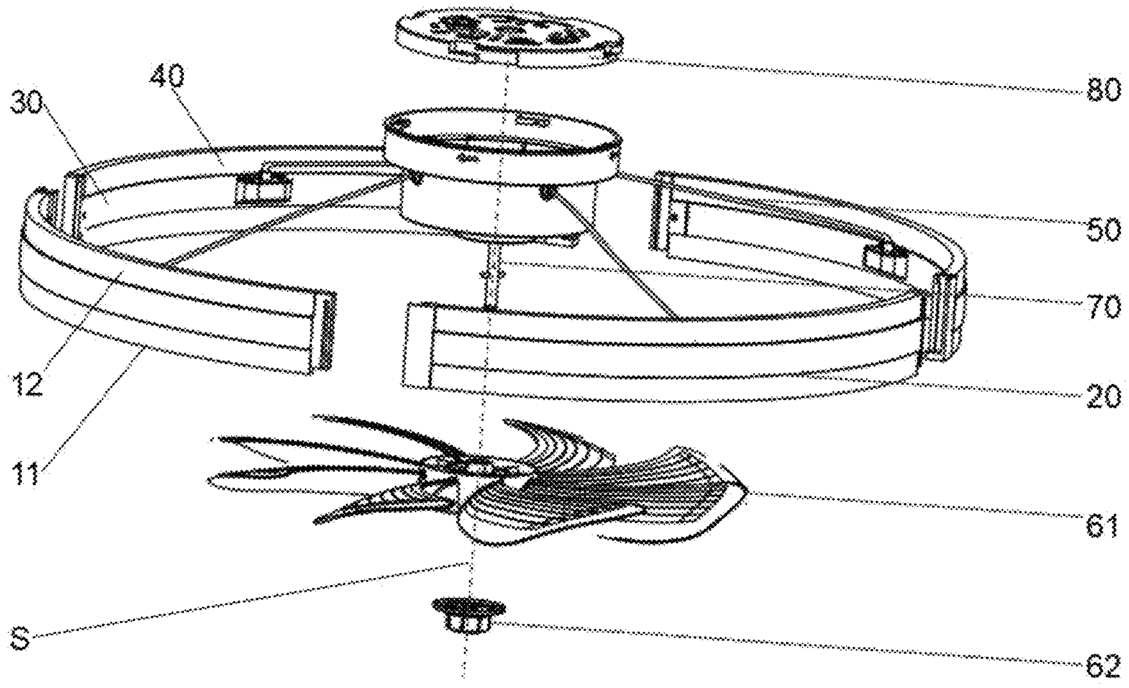
FIG. 4 is an exploded view of the fan assembly of FIG. 1.

Optionally, as shown in FIG. 3 and FIG. 7, arc lengths of the plurality of light-transmitting covers 10 are equal, and arc lengths of the plurality of light-shielding members 20 are equal. The arc length refers to an extension length of each of the light-transmitting cover 10 and the light-shielding member 20 along the circumferential direction of the fan assembly. In this way, both the light-transmitting cover 10 and the light-shielding member 20 are suitable for mass production. The light-transmitting cover 10 and the light-shielding member 20 may respectively adopt a set of molds for mold opening, and the cost of mold opening of the light-transmitting cover 10 and the light-shielding member 20 is reduced, which may reduce the cost of components of the fan lamp.

In some embodiments, the light-shielding member 20 includes a shielding plate 21 and reflective paper 22. The reflective paper 22 is arranged between the shielding plate 21 and the middle portion of the outer side wall of the light-transmitting cover 10, the reflective paper 22 can reflect light, the light reflected by the reflective paper 22 propagates in the light-transmitting cover 10, and finally exits from the upper portion of the outer side wall of the light-transmitting cover 10 and the lower portion of the outer side wall of the light-transmitting cover 10. In this way, the light of the light source 30 is efficiently and fully utilized, and the brightness of the upper bright region 12 and the lower bright region 11 is improved.

In other embodiments, the reflective paper 22 may be removed and a reflective coating is coated on the side of the shielding plate 21 adjacent to the light-transmitting cover 10, and the reflective coating can reflect light instead of the reflective paper 22.

Referring to FIG. 5, the first mounting groove 14 further includes a slot 141 at a bottom of the embedding groove 142. The reflective paper 22 is provided with a positioning hole 221, the light-shielding member 20 further includes an insertion block 211 protruding from a side of the shielding plate 21 adjacent to the light-transmitting cover 10. The insertion block 211 can pass through the positioning hole 221 and extend into the slot 141, and finally the shielding plate 21 and the light-transmitting cover 10 are inserted and fixed.

In this way, the insertion block 211 can be first passed through the positioning hole 221, then the shielding plate 21 and the reflective paper 22 are embedded into the embedding groove 142 as a whole at one time, and finally the reflective paper 22 is clamped between the shielding plate 21 and the bottom of the embedding groove 142, which simplifies the assembly of the fan lamp, and the fixed cooperation of the insertion block 211 and the inner wall of the slot 141 ensures that the shielding plate 21 and the reflective paper 22 are not easy to fall off.

It may be understood that, in another embodiment, the slot 141 may be disposed on the shielding plate 21, and correspondingly, the insertion block 211 is disposed at the bottom of the embedding groove 142.

In some embodiments, the light-emitting assembly includes a plurality of light sources 30. The light sources 30 and the light-transmitting covers 10 are equivalent in number and arranged in one-to-one correspondence. A plurality of light sources 30 are arranged along the circumferential direction of the fan assembly. Any adjacent two of the light sources 30 are connected end to end. An inner side wall of each of the light-transmitting covers 10 is provided with a second mounting groove 17. Each of the light sources 30 is arranged in the second mounting groove 17 of the corresponding light-transmitting cover 10.

In this way, a thickness of the light-emitting assembly is controlled, so as to prevent a total size of the fan lamp from being too large due to an excessive thickness of the light-emitting assembly, and prevent a space of the fan assembly from being occupied due to the excessive thickness of the light-emitting assembly. The thickness of the light-emitting assembly refers to a size of the light-emitting assembly in the radial direction of the fan assembly.

Furthermore, the light-emitting assembly further includes a plurality of back plates 40. The number of the light sources 30 is equivalent to that of the plurality of back plates 40 and the light sources 30 and the plurality of back plates 40 are arranged in one-to-one correspondence. The plurality of back plates 40 are arranged along the circumferential direction of the fan assembly. Any adjacent two of the plurality of back plates 40 are connected end to end. Each light source 30 is fixed to the inner side wall of the light-transmitting cover 10 through the back plates 40. With this arrangement, a stable and reliable connection is formed between the light source 30 and the light-transmitting cover 10.

Furthermore, referring to FIG. 2 to FIG. 4, FIG. 5 and FIG. 7, the fan lamp further includes a suspension wire 50 connecting the mounting bottom plate 80 and the back plate 40. A wire is arranged in the suspension wire 50, one end of the wire is connected to the power supply, the other end of the wire extends out of the back plate 40 to be connected to the light source 30. The suspension wire 50 is configured to bear the weight of the light-emitting assembly and the light-shielding member 20.

In one embodiment, referring to FIG. 6, each of the back plates 40 is arc-shaped, a head end of each of the back plates 40 is provided with a first hook 41, a tail end of each of the back plates 40 is provided with a second hook 42. Any adjacent two of the back plates 40 are hooked and connected by the first hook 41 and the second hook 42. The first hook 41 and the second hook 42 may abut against each other, or may be inserted into each other, or may abut against and be inserted into each other at the same time.

Compared with the prior art in which two groups of light-transmitting covers are arranged at intervals along a fan axis to obtain two bright regions spaced apart from each other, in the present disclosure, two bright regions spaced apart from each other are obtained from one light-transmitting cover 10 and the light-shielding member 20, and there is no need to use two groups of light-transmitting covers 10, so the number of the light-transmitting cover 10 is reduced, and the assembly step of the light-transmitting cover 10 is reduced. In addition, simplifying the two groups of light-transmitting covers 10 into one means that the number of the light sources 30 is reduced, there is no need to provide two groups of light sources 30 spaced apart from each other and two corresponding groups of light-transmitting covers 10, so the number of parts of the light-emitting assembly is reduced, the assembly process is simplified, and the cost is reduced.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A fan lamp, comprising a fan assembly and a light-emitting assembly disposed on a periphery of the fan assembly, wherein the light-emitting assembly comprises a light-transmitting cover and a light-shielding member mounted in a middle portion of an outer side wall of the light-transmitting cover, so that a lower bright region, a middle dark region, and an upper bright region are formed in sequence on the light-emitting assembly in a light-emitting state.

2. The fan lamp of claim 1, wherein the light-shielding member is connected to the light-transmitting cover in an insertion manner.

3. The fan lamp of claim 1, wherein the middle portion of the outer side wall of the light-transmitting cover is provided with a first mounting groove, and at least a part of the light-shielding member is embedded in the first mounting groove.

4. The fan lamp of claim 3, wherein an upper portion and a lower portion of the outer side wall of the light-transmitting cover are aligned with and in contact with edges of the light-shielding member, respectively.

5. The fan lamp of claim 4, wherein a side of the light-shielding member facing away from the light-transmitting cover, the upper portion of the outer side wall of the light-transmitting cover, and the lower portion of the outer side wall of the light-transmitting cover are all located in the same cylindrical surface.

6. The fan lamp of claim 3, wherein the light-shielding member comprises a shielding plate and a reflective paper, and the reflective paper is disposed between the shielding plate and the middle portion of the outer side wall of the light-transmitting cover.

7. The fan lamp of claim 6, wherein the first mounting groove further is provided with a slot, the reflective paper is provided with a positioning hole, the light-shielding member further comprises an insertion block protruding from a side of the shielding plate adjacent to the light-transmitting cover, the insertion block is capable of passing through the positioning hole and extending into the slot, resulting in that the shielding plate and the light-transmitting cover are fixed with each other.

8. The fan lamp of claim 1, wherein one end of the light-transmitting cover is provided with an end splicing groove, the other end of the light-transmitting cover is provided with an end splicing block, a shape of the end splicing block matches with a shape of an inner wall of the end splicing groove, the light-transmitting cover is in a circle shape by cooperation between the end splicing groove and the end splicing block.

9. The fan lamp of claim 1, wherein the light-emitting assembly comprises a plurality of light-transmitting covers and a plurality of light-shielding members, the plurality of light-transmitting covers are spliced end to end, and the plurality of light-shielding members are connected end to end.

10. The fan lamp of claim 9, wherein one end of each of the plurality of light-transmitting covers is provided with an end splicing groove, the other end of each of the plurality of light-transmitting covers is provided with an end splicing block, a shape of the end splicing block matches with a shape of an inner wall of the end splicing groove, adjacent two of the plurality of light-transmitting covers matches with the end splicing groove through the end splicing block to realize splicing connection.

11. The fan lamp of claim 9, wherein the plurality of light-transmitting covers are in one-to-one correspondence with the plurality of light-shielding members, respectively, the plurality of light-transmitting covers are arranged with equal lengths, and the plurality of light-shielding members are arranged with equal lengths.

12. The fan lamp of claim 1, wherein the upper bright region is uniformly arranged along a circumferential direction of the fan assembly and a width of the upper bright region is constant along an axis of the fan assembly, the lower bright region is uniformly arranged along the circumferential direction of the fan assembly and a width of the lower bright region is constant along the axis of the fan assembly, and the middle dark region is uniformly arranged along the circumferential direction of the fan assembly and a width of the middle dark region is constant along the axis direction of the fan assembly.

13. The fan lamp of claim 1, wherein the light-emitting assembly further comprises a light source and a back plate, an inner side wall of the light-transmitting cover is provided with a second mounting groove, and the light source is disposed in the second mounting groove and fixed to the light-transmitting cover through the back plate.

14. The fan lamp of claim 13, wherein the light-emitting assembly further comprises a plurality of back plates, the plurality of back plates are arranged along a circumferential direction of the fan assembly.

15. The fan lamp of claim 14, wherein each of the plurality of back plates is arc-shaped, one end of each of the plurality of back plates is provided with a first hook, the other end of each of the plurality of back plates is provided with a second hook, adjacent two of the plurality of back plates are connected by the first book and the second hook.

16. The fan lamp of claim 1, wherein the light-emitting assembly is in a complete ring shape or a partial ring shape.

* * * * *